July 25, 1961
E. A. MACHA ET AL
2,994,004
SEALED MOTOR PUMP UNIT
Filed Feb. 19, 1958
4 Sheets-Sheet 1
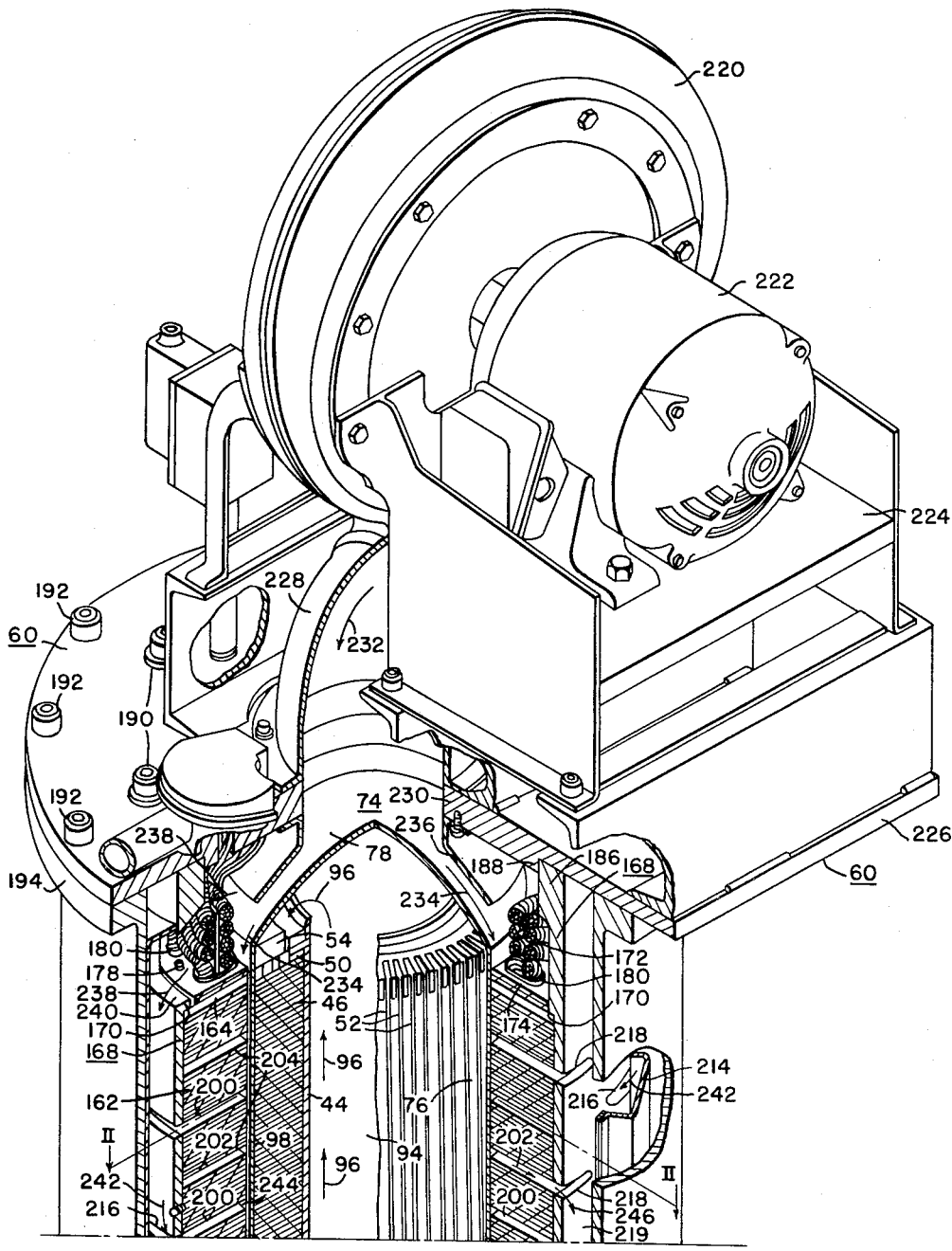
Fig. IA
WITNESSES
INVENTORS
Edward A. Macha &
Oliver P. Steele III
BY
Donald D. Smith
ATTORNEY July 25, 1961   E. A. MACHA ET AL   2,994,004
SEALED MOTOR PUMP UNIT Filed Feb. 19, 1958    4 Sheets-Sheet 3

July 25, 1961  E. A. MACHA ET AL  2,994,004
SEALED MOTOR PUMP UNIT

Filed Feb. 19, 1958  4 Sheets-Sheet 4

United States Patent Office 2,994,004
Patented July 25, 1961

2,994,004
SEALED MOTOR PUMP UNIT
Edward A. Macha, Wilmerding, and Oliver P. Steele III, Franklin Township, Westmoreland County, Pa., assignors to Westinghouse Electric Corporation, East Pittsburgh, Pa., a corporation of Pennsylvania
Filed Feb. 19, 1958, Ser. No. 716,163
12 Claims. (Cl. 310—42)

The present invention relates to a sealed motor pump combination adapted for operation at elevated temperatures and pressures and more particularly to a motor pump of the class described arranged for pumping molten metal at elevated temperatures.

In the type of motor pump unit described one or both of the rotor and stator are usually hermetically sealed for purposes of protecting these parts and of maintaining zero leakage in the event that the motor pump is employed in handling extremely hazardous fluids, such as molten metal. Prevention of any leakage is particularly important in those applications in which the fluid handled by the pump, which may be a liquid or molten metal or metallic alloy, is highly radioactive. In many types of sealed motor pumps the rotor thereof frequently is provided in the form of a squirrel cage rotor or in the form of a windingless rotor, which may be immersed and sealed within a suitable coolant system or within the system containing the fluid being pumped. The stator of the motor pump, however, being formed from insulated windings and therefore readily subject to adverse effects of high temperature and attack by corrosive fluids must be isolated from the remainder of the motor pump unit for purposes of cooling and for sealing the stator. Moreover, inasmuch as the stator is most likely to require maintenance and replacement as compared with other parts of the motor pump unit, it is highly desirable that the stator be mounted for ready accessibility and for easy removability from the motor pump unit. Frequently, however, the structure and arrangement of conventional motor pump cooling systems militate against easy removal of the stator assembly. This problem is complicated still further in those applications wherein the motor pump unit is employed within a highly radioactive environment which necessitates removal and replacement of the stator, when required, by remotely operated tools or manipulators.

In view of the foregoing, an object of the invention is to provide a novel and more efficient sealed motor pump unit.

Another object of the invention is to provide a sealed motor pump unit adapted for pumping liquid metal at elevated temperatures and more particularly to a motor pump unit adapted for handling highly radioactive liquid metal or other fluids.

Still another object of the invention is to furnish a sealed motor-pump combination wherein the stator thereof is mounted for ready removability and more particularly for withdrawal and replacement by remotely operated means.

A further object of the invention is to provide an improved cooling arrangement for use with a sealed motor pump unit of the character described.

A still further object of the invention is to provide a sealed motor pump unit of the character described with an improved rotor and novel sealing can or enclosure therefor.

These and other objects, advantages and features of the invention will be explained more fully during the forthcoming description of illustrative forms of the invention, with the description being taken in conjunction with the accompanying drawings, wherein:

FIGURES 1A and 1B together constitute an isometric view partially sectioned of one form of a sealed motor pump unit arrangement in accordance with the invention;

Figure 1B:
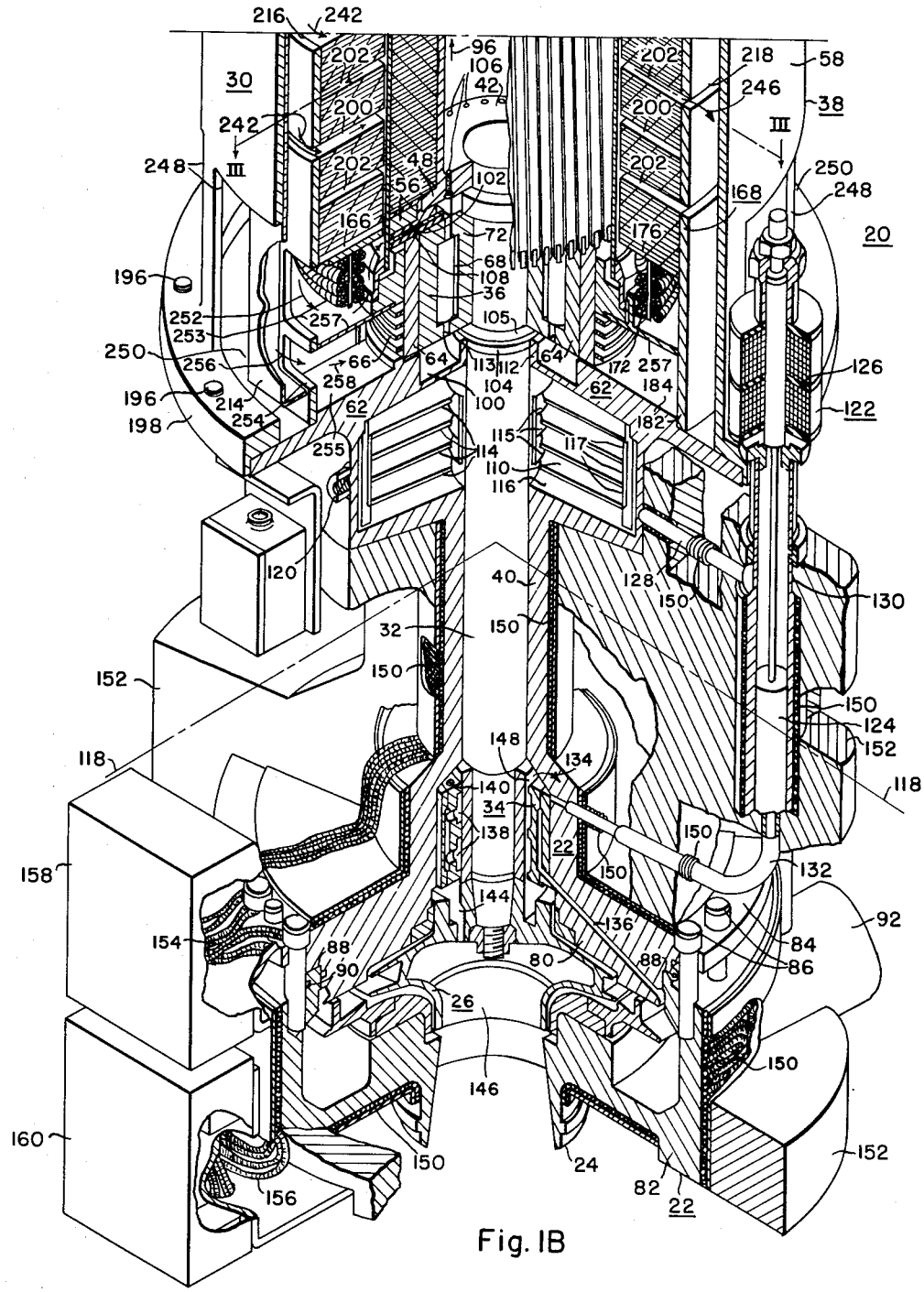

In accordance with the teachings of the present invention the stator of a sealed motor pump unit is arranged for facile removability therefrom by providing the motor pump unit with a novel stator cooling system and with a novel supporting arrangement for its rotor and rotor can. In this form of the invention the rotor and the rotor can or enclosure are supported in a cantilever fashion, as it were, which permits the stator to be slid thereover when removing or replacing the stator relative to the motor pump unit. Similarly, cooling means are provided for the slip-on stator, which cooling means likewise can be readily removed in a unitary fashion with the stator.

Referring now more particularly to the drawings, the illustrative form of the invention shown therein comprises a sealed motor pump unit indicated generally by the reference character 20 and adapted particularly in this example for operation with a high temperature liquid metal or metallic alloy. The motor pump unit comprises a pump casing 22 provided with a suction nozzle 24, an impeller 26, a motor rotor 28, and a stator assembly indicated generally by the reference character 30. The rotor 28 and the impeller 26 are joined, respectively, in this example to the ends of a driving shaft 32. The shaft 32 is mounted for rotation by a hydrostatic bearing denoted generally by the reference character 34 and mounted within the pump casing 22, and by a roller bearing arrangement 36 mounted adjacent the lower end of the motor casing 38. The driving shaft 32 extends through a neck portion 40 connecting the motor housing 38 with the pump casing 22 and terminates at its upward or motor end in a rotor end plate 42.

The rotor 28 is tubular in form and comprises a cantilever supporting tube 44 extending longitudinally thereof and joined, as by welding, at its lower end to the aforementioned rotor end plate 42. Surrounding the outer periphery of the supporting rotor 44 are a plurality of rotor laminations 46 which are secured in position by an outwardly projecting shoulder 48 of the rotor end plate 42 and by an annular retaining ring 50 secured to the rotor tube 44 adjacent its opposite end. Disposed in a series of slots extending longitudinally of the laminated structure of the rotor are a like plurality of rotor bars or conductors 52. The rotor conductors are formed into a squirrel cage circuit arrangement by a pair of shorting rings 54 and 56 joined respectively to opposite ends of the rotor conductors 52.

The motor housing 38 noted heretofore consists of a stator sleeve 58 and upper and lower end plates 60 and 62, respectively. To the lower end plate 62 is joined an upwardly extending tubular projection 64 which is disposed substantially concentrically of the driving shaft 32. The outer race of the bearing 36 is mounted upon the inner surface of the tubular projection 64, and heat developed in the bearing 36 is transferred to the tubular projection 64 from which it is in turn radiated to the stator cooling system presently to be described by means of a plurality of radiating fins 66 formed on substantially the entire outer surface of the tubular projection 64.

The inner race of the bearing 36 is mounted on the driving shaft 32 adjacent the upper end thereof.

The rotor 28 is provided with a sealed enclosure 74 which likewise is mounted in a cantilever fashion. The rotor enclosure 74 comprises an elongated, cylindrical portion 76 surrounding the rotor 28 and is closed at its top end by an oblate hemispherical end portion 78. The lower end of the rotor enclosure 74 is joined and hermetically sealed, for example by welding, to the tubular projection 64 of the lower end plate 62. It will thus be seen that the rotor enclosure 74 lies within the so-called air gap between the rotor 28 and the stator assembly 30 and therefore is formed of a thickness such as to prevent loss of operating torque resulting by from too wide an air gap. In this example, the rotor enclosure 74 desirably is formed from a relatively thin material, which moreover has substantial electrical resistance, such as an alloy of nickel, iron and cobalt, in order to reduce eddy current losses in the rotor enclosure. In case the interior of the rotor enclosure 74 is subjected to elevated pressures, the rotor enclosure 74 can be fabricated from a relatively thick semi-magnetic material such as that disclosed in a copending application of William E. McCown, entitled Electric Motor Device, filed March 25, 1955, Serial No. 496,832 now Pat. No. 2,857,537, and assigned to the assignee of the present invention. The moving components of the sealed motor pump unit, including the rotor 28, the driving shaft 32, and the impeller 26, are thus hermetically sealed within the rotor enclosure 74, the lower plate tubular extension 64, the connecting neck portion 40, and the pump casing 22.

As indicated more particularly in FIG. 1, the pump casing 22 includes an upper portion 80 and a lower or volute portion 82. The upper casing portion 80 is furnished with a mounting flange 84 which is joined to the volute portion 82 of the pump casing by means of a plurality of mounting bolts 86. However, the actual junction 88 of the pump casing components 80 and 82 lies inwardly of the mounting bolts 84 and thus the junction 88 can be hermetically sealed, if desired, by means of a sealing weld 90, such as that described in Patent 2,805,789, issued September 10, 1957, to E. J. Kreh and C. M. Ladd and assigned to the assignee of the present application. Where it is desired, the sealed motor pump unit 20 can be hermetically sealed within the system with which it is utilized by seal-welding the suction nozzle 24 to the corresponding portion of the system. In a like manner, discharge nozzle 92 can be hermetically sealed to the system.

The hollow interior of the rotor 28 together with the interior of the rotor enclosure 74 and the lower plate tubular projection 64 are filled with an inert gas such as helium or nitrogen. The inert gas is thus arranged to aid in removing heat developed in the rotor 28 by circulating by means of convection currents through the hollow portion 94 of the rotor and the gap 98 between the outer periphery of the rotor 28 and the inner surface of the rotor enclosure 74 as indicated by flow arrows 96. During its passage through the aforesaid gap 98 the inert gas transfers its heat through the rotor enclosure 74 to the stator cooling system presently to be described. After passing through the gap 98 the inert gas flows between a series of horizontal spaced discs 108 supported between the upper bearing 36 and the lower end of the rotor 28. The horizontal discs 108 serve to reduce the flow of heat between the rotor 28 and the upper bearing 36. From the longitudinal discs 108 the inert gas flows upwardly and returns to the interior 94 of the hollow rotor 28 through a plurality of flow apertures 106 spaced adjacent the outer edge of the rotor end plate 42. Thus, the cooling system associated with the rotor 28 and upper bearing 36 and comprising the inert gas circuit described heretofore is likewise hermetically sealed within the motor pump unit 20.

Directly below the upper bearing 36, an annular recess 100 is provided for purposes of catching and collecting any lubricant that may drip from the bearing 36 during operation of the motor pump. In furtherance of this purpose, the driving shaft 32 is furnished with a flange member 104, which is positioned adjacent the lower end of the inner race of the bearing 36. In this arrangement, the flange member 104, is formed integrally with the shaft 32 and the upper surface 105 of the flange member is inclined in order to deflect drippings downwardly and outwardly from the shaft 32. Cooperating with the flange member 104 is an upstanding cylindrical projection 112, which forms the inner wall portion of the annular recess 100. A terminal edge 113 of the cylindrical projection 112 is beveled in order to aid in collecting lubricant flowing from the flange member 104 and in directing the lubricant into the recess 100.

Adjacent the lower end of the bearing 36, the rotor coolant system communicates with a thermal barrier, indicated generally by the reference character 110, through the normal tolerances of the bearing 36. The pressures in the rotor enclosure and in the thermal barrier 110 is filled normally, therefore, with the inert gaseous filling of the rotor chamber and comprises a plurality of spaced baffles 114 mounted within an annular chamber 116 which surrounds the driving shaft 32. The baffles 114 are provided with relatively small flow apertures 115 and thereby serve to minimize convection currents within the thermal barrier 110, which currents otherwise would permit an excessive transfer of heat from the liquid metal contained within the motor pump unit 20, in a manner presently to be described in greater detail. The baffles 114 are assembled between spacing rings 117, which, in turn, are mounted upon a supporting cylinder 119, and the assembly thus formed is fitted relatively loosely within a thermal barrier chamber 116. The thermal barrier 110, in addition, serves as a reservoir for an excess quantity of liquid metal in the event that the liquid metal contained within the motor pump unit rises above the normal operating level indicated by reference lines 118. In such event the reservoir chamber 116 of the thermal barrier 110 is coupled to a surge tank or chamber (not shown) through an outlet connection 120 in order to prevent excessive build up of pressure within the rotor chamber. The baffles 114 are dished slightly, as illustrated in FIG. 1, to facilitate drainage of fluid, when the level thereof falls, through the flow apertures 115, which are disposed adjacent the inner periphery of the baffles.

The level of the molten metal contained within the motor pump unit 20 is indicated by a suitable liquid level device indicated generally by the reference character 122. The liquid level device comprises a float 124 and suitable indicating means including the differential transformer arrangement 126 and suitable differential output measuring circuitry (not shown). Pressures above and below the float 124 are equalized by means of a conduit 128 communicating with the thermal barrier reservoir 110 and sealed tubular casing 130 of the liquid level indicator and by another conduit 132 communicating with the lower end of the liquid level casing 130 and the annular space 134 in which the aforementioned hydrostatic bearing 34 is mounted.

The full head developed by the motor pump unit is applied to the hydrostatic bearing arrangement 34 through a passage 136 formed within the upper portion 80 of the pump casing 22. In a well-known manner the driving shaft 32 adjacent the hydrostatic bearing 34 is supported as a result of the kinetic energy of the liquid metal streams flowing through the pressure dropping orifices 138 of the hydrostatic bearing 34. From the orifices the liquid metal flowing therethrough is conveyed at reduced pressure through axial openings in the ends of the hydrostatic bearing such as the opening 140 and through a passage 144 back to the eye 146 of the impeller 26. However, some of the liquid metal issuing from the axial openings 140 communicates through an annular space 148 with the aforementioned liquid level indicator conduit 132 in order to supply liquid metal to the lower portion of the liquid level casing 130. The pressure of the liquid metal within the motor pump unit likewise determines the height to which the molten metal will rise along the connecting neck portion 40 in the space or tolerance between this portion and the driving shaft 34.

All of those portions of the pump casing 22 and adjacent components with which the liquid metal is likely to come into contact are surrounded by electrical heating coils 150 in order to prevent freezing of the liquid metal and resultant clogging of passages within the motor pump unit and particularly to aid in starting up the motor pump after an inactive period. Thus, the entire connecting neck portion 40, the upper and lower liquid level conduits 128 and 132 and the portion of the liquid level indicator casing 130 extending therebetween are surrounded with electrical heating coils 150. Heat loss outwardly from the electric heating coils 150 is minimized by means of lagging or thermal insulation indicated generally by the reference character 152. Electrical connections to the heating coils 150 are made by means of electrical leads 154 and 156. The leads 154 and 156 together with their associated terminals are enclosed within the housings 158 and 160, respectively. If desired, similar electric heating coils (not shown) can be placed adjacent the thermal barrier 110; however, inasmuch as it is contemplated that the molten metal will not rise to any great height within the thermal barrier 110, the latter-mentioned heating coils are omitted in this example of the invention.

In order to permit ready withdrawal and replacement of the stator assembly 30 an improved stator assembly and cooling arrangement therefor are utilized. The stator assembly 30, of course, is separated from the hermetically sealed portions of the motor pump unit 20 by means of the rotor enclosure 74. The stator assembly 30 and its associated cooling system is adapted for removal from the motor pump 20 without removing the stator sleeve 58 in a manner presently to be described.

The stator assembly 30 comprises a plurality of laminar discs 162 which are grouped along the length of the stator assembly 30 for purposes set forth hereinafter, and are secured in place by a pair of upper and lower annular retaining discs 164 and 166. The upper retaining disc 164 is secured in its desired position adjacent the upper end of a stator shell 168 by means of an inwardly extending annular shoulder 170 while the lower retaining disc 166 is secured adjacent the bottom end of the stator shell 168 by means of welding or the like. Suitable longitudinally extending slots 206 (FIG. 3) are provided in the laminations 162 adjacent the bore of the stator in which stator windings 207 are mounted, the end turns 172 of which protrude through annular slotted insulating discs 174 and 176, respectively. The slotted discs 174 and 176 are secured respectively to the retaining discs 164 and 166 by means of mounting screws 178. Adjacent the slots of each disc 174 and 176 a plurality of U-shaped slot liners 180 are secured respectively in order to prevent sharp bending of the end turns 172 and attendant wearing of the insulation thereof.

The lower end 182 of the stator shell 168 is positioned relative to the lower motor supporting plate 62 by means of a circular shoulder 184 which is formed on the latter-mentioned plate concentrically with the driving shaft 32. The upper end of the stator shell 168, which terminates in a thickened portion 186, positions in a similar manner relative to the upper motor supporting plate 60 by means of a circular shoulder 188 thereof. When thus positioned, the stator shell 168 is secured to the upper motor supporting plate 60 by means of a plurality of bolts 190 which are inserted through suitable apertures in the upper plate 60 and are threaded into suitable tapped holes formed in the thickened end portion 186 of the stator shell 168. Inasmuch as the lower end 182 of the stator shell 168 is not secured to the upper surface of the lower motor plate 62, it will be apparent that merely by removing the mounting bolts 192 which secure the upper motor plate 60 to an upper mounting flange 194 of the stator housing 58 the entire stator assembly 30 together with the upper motor plate 60 can be lifted upwardly and removed from the remainder of the motor pump unit 20. It will further be apparent, in those applications wherein the motor pump unit 20 is employed in relatively inaccessible locations or wherein the unit is utilized for pumping highly radioactive materials, that this operation can readily be achieved with the use of remotely operated tools and suitable lifting hooks (not shown) secured to the upper motor plate 60. When the stator assembly 30 and associated components are being reinserted into the stator sleeve 58 suitable means presently to be described are provided for guiding the descending stator assembly 30 to a position of engagement with the circular shoulder 184 of the lower motor plate 62. Thus, the stator sleeve 58 normally remains in its operating position where it is secured by means of bolts 196 which fasten a lower mounting flange 198 of the stator sleeve 58 to the outward edge portion of the lower motor plate 62.

Figure 2:
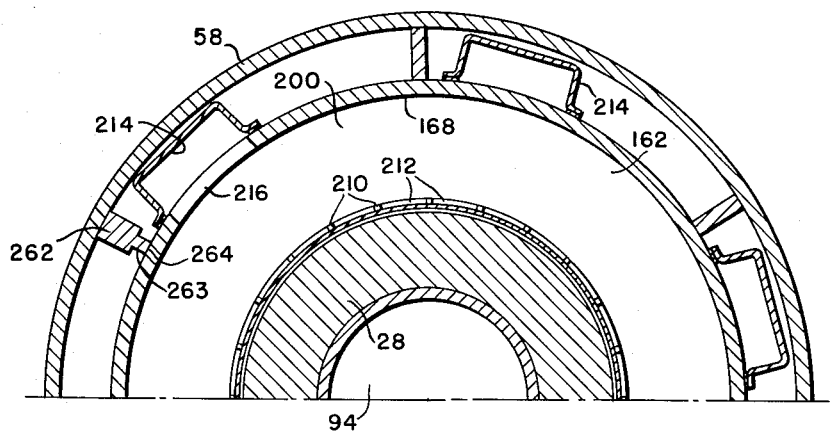
FIG. 2 is a partial cross-sectional view of the motor pump unit shown in FIG. 1 and taken along reference lines II—II thereof.
Figure 3:
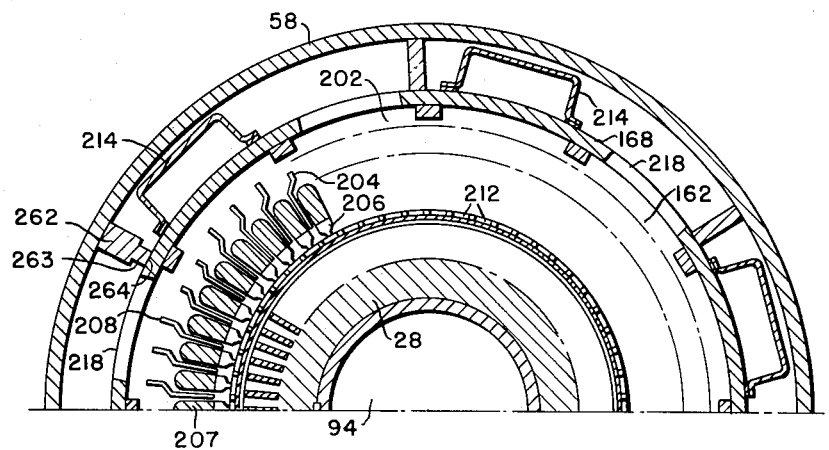
FIG. 3 is a partial cross-sectional view of the motor pump unit shown in FIG. 1 taken along reference lines III—III thereof, with the stator and rotor slots and associated parts having been omitted for purposes of clarity.
Figure 4:
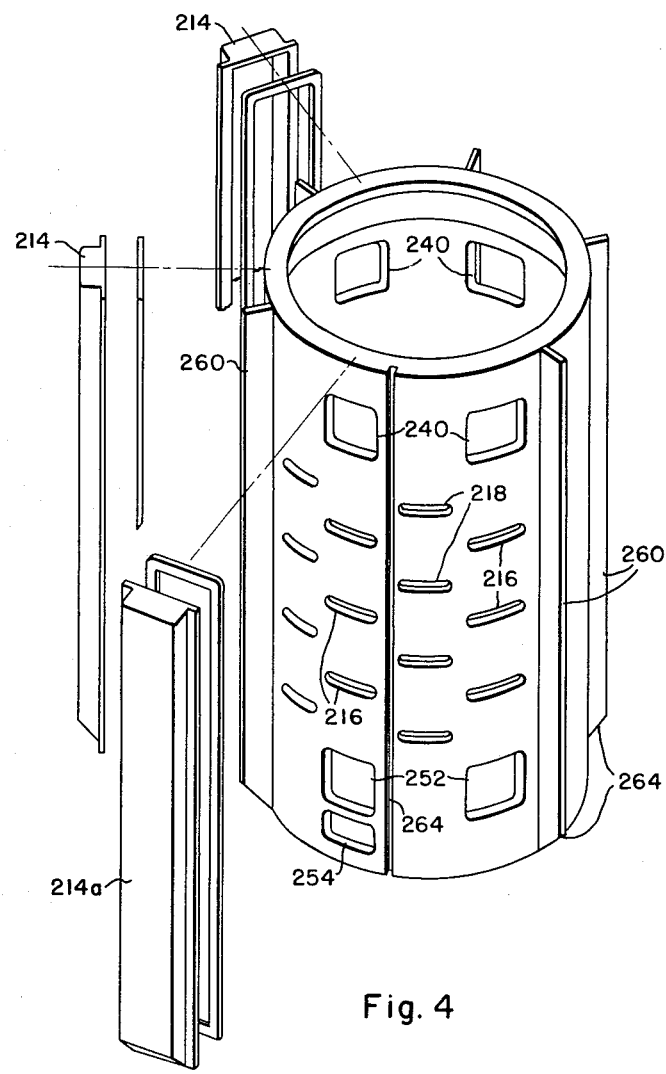
FIG. 4 is a diminutive, exploded view showing the stator shell and some of the cooling conduits associated therewith and illustrated in FIGS. 1 to 3 of the drawings.

Returning now to the grouped laminar discs 162, a plurality of radial coolant flow passages 200 and 202 are formed therebetween by a plurality of spacing members, one form of which is described hereinafter. The spacings required for these coolant passages 200 and 202 are maintained between the groups of laminar discs 162, in this example, by means of a plurality of radially extending fingers 204. As better shown in FIG. 3 of the drawings the fingers 204 are secured between the slots 206 of the adjacent laminar discs 162 and are bent as indicated by the reference character 208 to ensure that they remain in their edge-mounted positions. The fingers 204 are secured in any convenient fashion to one or both of the adjacent laminar discs as by spot welding or by a tab or slot arrangement (not shown). Additionally, as shown in FIGS. 2 to 4 of the drawings, longitudinal coolant flow passages are formed between the bore of the stator assembly 30 and the rotor enclosure 74 by means of suitable spacing members or projections, for example, spaced longitudinally extending wires 210. These wires 210 function partially to support and precisely to space the rotor enclosure 74 from the bore of the stator assembly 30 and consequently from the cantilever rotor assembly 28. The spacing wires desirably are secured as by welding to the upper and lower retaining discs 164 and 166 of the stator assembly. With this arrangement, then, the radial coolant passages 200 and 202 communicate freely with additional coolant passages 212 formed between the spacing wires 210 and extending longitudinally.

Outwardly of the stator shell 168 a plurality of coolant inlet channels are provided by means of longitudinally extending trough or channel members 214. The trough members 214 extend substantially along the length of the stator shell 168 and are secured at spaced positions about the outer periphery of the stator shell. As indicated in FIG. 4 of the drawings, six of these trough members 214 are employed, although only three are shown in this exploded view for purposes of illustration.

Communicating with each of the trough members 214 are a plurality of flow apertures 216 which connect the coolant channels formed by the trough members 214 with the radial coolant passages 200 formed in the laminar structure of the stator assembly 30. Thus, it will be seen that every other one of the radial coolant passages 200 and 202 are thus coupled to the coolant inlet channels formed by the members 214. The remainder of the radial coolant passages 202 communicate with an annular space 218 formed between the stator guide sleeve 58 and the stator shell 168 by means of additional flow apertures 218, each group of which is spaced between adjacent groups of flow apertures 216.

A suitable coolant, for example air, is forced through the stator cooling system by means of a blower or centrifugal pump 220 and a suitable driving mechanism, for an example an electric motor 222. The motor and blower combination are mounted upon an appropriate supporting structure, indicated generally by the reference character 224, which is, in turn, secured to an extension 226 of the upper motor plate 60. The blower 220 communicates with the space between the upper end 78 of the rotor enclosure 74 and the upper motor plate 60 through a relatively large conduit 228 joined to a central flow aperture 230 formed in the upper motor plate 60. The coolant discharged by the blower 220 is conducted downwardly through the conduit 228, as indicated by flow arrows 232, where it flows over the hemispherical end surface 78 of the rotor enclosure 74. A small portion of the flow enters the longitudinal passages 212 between the spacing wires 210 and between the bore of the stator assembly 30, as indicated by arrows 234. This portion of coolant flow is appropriately guided to the passages 212 by means of an annular flow baffle 236.

The greater portion of the flow, however, is directed around the stator end turns 172, as shown by flow arrows 238, where it enters the longitudinal trough members 214 through an equivalent number of openings 240 formed in the stator shell 168 adjacent the upper end thereof, as better shown in FIG. 4 of the drawings. From the trough members 214 the coolant enters the radial flow passages 200 through the flow apertures 216, as indicated by flow arrows 242. After passing through the radial flow passages 200, the coolant reaches the longitudinal passages 212 and guided by the spacing wires 210 flow upwardly and downwardly as shown by the branched arrows 244 to adjacent ones of the radial passages 202. From the passages 202, the coolant then flows outwardly through the flow apertures 218 into the annular space 219 between the stator shell 168 and the stator guide sleeve 58, as shown by flow arrows 246. From the annular passage 219, the coolant then leaves the motor pump unit 20 through a plurality of relatively large openings 248 spaced peripherally about the lower end of the stator guide sleeve 58, as denoted by flow arrows 250.

That portion of the coolant flowing through the longitudinal trough members 214 which portion has not entered the flow apertures 216 of the stator shell is conducted through openings 252 and 254 of the stator shell 168. These openings 252 and 254 communicate with the trough members 214, and the lower end turn chamber 253 and the bearing radiating chamber 255, respectively, with these chambers 253 and 255 being separated by an annular plate 257. In this arrangement, six openings 252 are provided respectively in communication with the channel members 214, while only one opening 254 is associated with a selected one 214a (FIG. 5) of the channel or trough members 214. For this reason, the channel member 214a is longer than the remaining channel members. Thus, that portion of the coolant entering the openings 252 flows around the lower end turns 172 and upwardly through the coolant passages 212 to one or more of the outlet radial coolant passages 202, as indicated by flow arrows 256. Another portion of the incoming coolant enters the aperture 254, as indicated by flow arrows 258, where it contacts the bearing radiating fins 56 and then flows circumferentially around the fins 56 and exits from the stator shell 168 through an outlet aperture (not shown) disposed in the shell 168 about 180° removed from the aperture 254. From the outlet aperture the coolant flows into the annular space between the stator shell 168 and the stator sleeve 58 and thence out of the motor pump unit 20 via the openings 248.

With this arrangement it will be seen that an easily removable, unitary stator assembly and cooling arrangement therefore are disclosed herein. To aid in replacing the stator assembly in the motor pump unit 20, a plurality of radial spacing ribs 260, in this example five, are secured to the outer periphery of the stator shell 168, as better shown in FIG. 4. In this example of the invention, the spacing ribs extend longitudinally of the shell 168 and are mounted between the coolant trough members 214 and extend longitudinally thereof. The ribs 260 in this example are secured by insertion in longitudinally extending slots formed in the outer surface of the stator shell 168, or alternatively by welding to the outer surface of the stator shell. The width of the ribs is such that when the stator assembly is mounted within the stator guide sleeve 58, the outer edges of the ribs 260 fit relatively closely with the inner surface of the stator sleeve 58. The lower ends of each of the spacing ribs 160 desirably are tapered, as indicated by the reference characters 264, in order to guide the stator assembly 30 into proper relationship with the circular shoulder 184 of the lower motor plate 62 when the stator assembly is initially inserted into the upper end of the stator sleeve 58.

Alternatively, the spacing ribs 260 can be omitted and the channel members 214 and 214a can be fabricated with sufficient depth and strength so as to fit closely within the stator sleeve 58. In either case, the stator assembly 30, when being inserted into the motor pump unit, is located circumferentially by means of a longitudinally extending keying member 262 (FIGS. 2, 3 and 4) affixed to the inward surface of the stator sleeve 58. When properly positioned a projecting edge portion 263 cooperates with a longitudinally extending groove 264 formed on the exterior of the stator shell 168 between an adjacent pair of the channel members 214.

From the foregoing it will be apparent that a novel and efficient form of a motor pump unit 20 has been disclosed herein. The motor pump unit is adapted particularly, but not necessarily, for uses with molten metal maintained at elevated temperatures and for use with a hermetically sealed system. Moreover, this motor pump unit is arranged for mounting in relatively inaccessible locations or for use in radio active applications which prevent maintenance personnel from approaching the hermetically sealed portions, particularly the pump casing 22, for maintenance or repair of the stator assembly 30.

Numerous modifications of the invention will occur to those skilled in the art without departing from the spirit and scope of the invention. Moreover, it is to be understood that certain features of the invention can be employed without a corresponding use of other features.

Accordingly, what is claimed as new is:

1. In a dynamoelectric device, the combination comprising a driving shaft, means for mounting said shaft for rotative movement, a cantilever rotor joined adjacent one end of said shaft for rotation therewith, an elongated housing, said shaft being rotatively mounted at one end of said housing, the other end of said housing including a removable end plate, a cantilever rotor enclosure joined to said one housing end, and an annular stator assembly removably engaging said one housing end and secured to said other end of said housing so that said stator may be removed from said housing through said other end of said housing.

2. In a dynamoelectric device, the combination comprising a driving shaft, means for mounting said shaft for rotative movement, a cantilever rotor joined adjacent one end of said shaft for rotation therewith, an elongated housing, said shaft being rotatively mounted at one end of said housing, a cantilever rotor enclosure joined to said one housing end, an annular stator assembly removably engaging said one housing end and secured to the other end of said housing, and a plurality of spacing wires engaged between said rotor enclosure and the inner periphery of said stator assembly.

3. In a dynamoelectric device, the combination comprising a driving shaft, means for mounting said shaft for rotative movement, a cantilever rotor joined adjacent one end of said shaft for rotation therewith, an elongated housing, said shaft being rotatively mounted at one end of said housing, a cantilever rotor enclosure joined to said one housing end, and a hollow annular stator assembly removably engaging said one housing end and secured to the other end of said housing, and means spacing said stator assembly from said rotor enclosure and forming axial coolant passages therebetween, said stator assembly including a plurality of spaced groups of laminations and a plurality of spacing members disposed between said groups to form radial coolant passages disposed therebetween and communicating with said axial coolant passages.

4. In a dynamoelectric device, the combination comprising a driving shaft, means for mounting said shaft for rotative movement, a cantilever rotor joined adjacent one end of said shaft for rotation therewith, an elongated housing, said shaft being rotatively mounted at one end of said housing, a cantilever rotor enclosure joined to said one housing end, an elongated hollow annular stator assembly removably engaging said one housing end and secured to the other end of said housing, means spacing said stator assembly from said rotor enclosure and forming axial coolant passages therebetween, said stator assembly including a plurality of groups of laminar discs, said groups being spaced longitudinally along the length thereof, and a plurality of spacing members inserted between said groups to form radial coolant passages between said groups, said radial coolant passages communicating with said axial coolant passages.

5. In a dynamoelectric device, the combination comprising a driving shaft, means for mounting said shaft for rotative movement, a cantilever rotor joined adjacent one end of said shaft for rotation therewith, an elongated housing, said shaft being rotatively mounted at one end of said housing, a cantilever rotor enclosure joined to said one housing end, a hollow annular stator assembly removably engaging said one housing end and secured to the other end of said housing, said stator assembly including a plurality of spaced groups of laminations and a plurality of spacing fingers disposed between said groups to form radial coolant passages therebetween, and a plurality of spacing wires inserted between said stator assembly and said rotor enclosure and defining axial coolant passages communicating with said radial coolant passages.

6. In a dynamoelectric device, the combination comprising a driving shaft, means for mounting said shaft for rotative movement, a cantilever rotor joined adjacent one end of said shaft for rotation therewith, an elongated housing, said shaft being rotatively mounted at one end of said housing, a cantilever rotor enclosure joined to said one housing end, an elongated hollow annular stator assembly removably engaging said one housing end and secured to the other end of said housing, said stator assembly including a plurality of groups of laminar discs, said groups being spaced longitudinally along the length of said stator assembly, a plurality of spacing fingers inserted between said groups to maintain radial coolant passages between said groups, and a plurality of spacing wires extending longitudinally of said stator assembly and defining axial coolant passages communicating with said radial coolant passages.

7. In a dynamoelectric machine, the combination comprising a housing including a pair of spaced supporting members, a driving shaft mounted for rotation on one of said supporting members, a cantilever rotor joined to said driving shaft for rotation therewith, a cantilever rotor enclosure joined to said one supporting member, a hollow annular stator assembly surrounding said rotor enclosure and joined to the other of said supporting members, elongated members interposed between said stator assembly and said rotor enclosure for spacing the inner periphery of said stator assembly from said rotor enclosure and for defining axial coolant passages therebetween, said stator assembly having flow passages communicating with said coolant passages, and cooling means for maintaining a flow of coolant through said coolant passages and said flow passages.

8. An annular stator assembly for use with dynamoelectric machinery, said assembly comprising a plurality of groups of laminations, radially extending spacing means between said groups for forming radial inlet and outlet coolant passages through said stator assembly, a stator shell surrounding said groups of laminations, said shell having a first series of spaced flow apertures communicating with said inlet flow passages and a second series of spaced flow apertures communicating with said outlet flow passages, at least one coolant channel member communicating with all of said first flow apertures, and means for circulating a coolant through said channel member.

9. In a dynamoelectric machine, the combination comprising a hollow annular stator assembly including a plurality of groups of laminations, radially extending spacing means between said groups for forming radial inlet and outlet cooling passages through said stator assembly, a stator shell surrounding said groups of laminations, said shell having a first series of spaced flow apertures communicating with said inlet flow passages and a second series of spaced flow apertures communicating with said outlet flow passages, at least one coolant channel member communicating with all of said first flow apertures, means for circulating a coolant through said channel member, a rotor mounted for rotation within said stator assembly, a rotor enclosure mounted between said stator assembly and said rotor, and means for spacing said stator assembly from said enclosure, said means forming coolant passages communicating with said inlet and outlet coolant passages respectively.

10. In a dynamoelectric machine, the combination comprising a housing including a pair of spaced supporting members, a driving shaft mounted for rotation on one of said supporting members, a cantilever rotor joined to said driving shaft adjacent an end thereof for rotation therewith at a position intermediate said supporting members, a cantilever rotor enclosure closed at one end and joined at its open end to said one supporting member, an elongated hollow annular stator assembly surrounding said rotor and said rotor enclosure and secured to the other of said supporting members, a plurality of inlet and outlet coolant passages formed in said stator structure along the length thereof, spacing means disposed between the inner periphery of said stator structure and the outer surface of said rotor enclosure and defining flow passages therebetween, said inlet and outlet passages communicating at the inward extremity thereof with said flow passages, a stator shell surrounding said stator assembly and having a plurality of first and second flow apertures communicating respectively with said inlet and outlet flow passages, and means for circulating coolant material through said flow apertures.

11. In a dynamoelectric machine, the combination comprising a housing including a pair of spaced supporting members, a driving shaft mounted for rotation on one of said supporting members, a cantilever rotor joined to said driving shaft for rotation therewith at a position intermediate said supporting members, a cantilever rotor enclosure closed at one end and joined at its other end to said one supporting member, an elongated hollow stator assembly surrounding said rotor and said rotor enclosure and secured to the other of said supporting members, a plurality of inlet and outlet coolant passages formed in said stator structure along the length thereof, spacing means disposed between the inner periphery of said stator structure and the outer surface of said rotor enclosure and defining flow passages therebetween, said inlet and outlet passages communicating at the inward extremity thereof through said flow passages, a stator shell surrounding said stator assembly and having a plurality of first and second flow apertures communicating respectively with said inlet and outlet flow passages, and means for circulating a quantity of coolant through said flow apertures, said last-mentioned means including a plurality of coolant channel members secured to said stator shell and communicating with said first apertures only.

12. In a dynamoelectric machine, the combination comprising a housing including a pair of spaced supporting members, a driving shaft mounted for rotation on one of said supporting members, a cantilever rotor joined to said driving shaft for rotation therewith at a position intermediate said supporting members, a cantilever rotor enclosure closed at one end and joined at its other end to said one supporting member, an elongated hollow stator assembly surrounding said rotor and said rotor enclosure and secured to the other of said supporting members, a plurality of inlet and outlet coolant passages formed in said stator structure along the length thereof, spacing means disposed between the inner periphery of said stator structure and the outer surface of said rotor enclosure and defining flow passages therebetween, said inlet and outlet passages communicating at the inward extremity thereof through said flow passages, a stator shell surrounding said stator assembly and having a plurality of first and second flow apertures communicating respectively with said inlet and outlet passages, and means for circulating a quantity of coolant through said flow apertures, said last-mentioned means including a plurality of coolant channel members secured longitudinally of said stator shell and communicating with said first apertures only, a stator guide sleeve spacedly surrounding said stator shell and joined at its ends to said supporting members respectively, the outward surfaces of said coolant channel members closely fitting the inward surface of said stator guide sleeve to aid in positioning said stator assembly relative to said one supporting member and to form additional coolant passages communicating with said second flow apertures.

References Cited in the file of this patent

UNITED STATES PATENTS

| | | |
|---|---|---|
| 1,448,700 | Seidner | Mar. 13, 1923 |
| 1,736,002 | Frickey et al. | Nov. 19, 1929 |
| 2,075,895 | Harmon | Apr. 6, 1937 |
| 2,497,650 | Anderson | Feb. 14, 1950 |
| 2,618,756 | Fechheimer | Nov. 18, 1952 |
| 2,722,616 | Moses | Nov. 1, 1955 |

FOREIGN PATENTS

| | | |
|---|---|---|
| 1,049,445 | France | Dec. 29, 1953 |
| 1,117,513 | France | May 23, 1956 |